United States Patent
Lin et al.

(10) Patent No.: US 10,198,095 B2
(45) Date of Patent: Feb. 5, 2019

(54) LASER SPOT DETECTING AND LOCATING SYSTEM AND METHOD THEREOF

(71) Applicant: Chung Yuan Christian University, Taoyuan (TW)

(72) Inventors: Ting-Lan Lin, Taoyuan (TW); Shih-Lun Chen, Taoyuan (TW); Szu-Ching Pan, Pingtung County (TW)

(73) Assignee: Chung Yuan Christian University (TW)

( * ) Notice: Subject to any disclaimer, the term of this patent is extended or adjusted under 35 U.S.C. 154(b) by 0 days.

(21) Appl. No.: 15/836,930

(22) Filed: Dec. 11, 2017

(65) Prior Publication Data

US 2018/0307335 A1    Oct. 25, 2018

(30) Foreign Application Priority Data

Apr. 19, 2017  (TW) .............................. 106113048 A (51) Int. Cl.
| | |
|---|---|
| *G02B 27/20* | (2006.01) |
| *G06F 3/038* | (2013.01) |
| *H04N 9/31* | (2006.01) |

(52) U.S. Cl.
CPC ........... *G06F 3/0386* (2013.01); *G02B 27/20* (2013.01); *G06F 3/0383* (2013.01); *H04N 9/3179* (2013.01); *H04N 9/3194* (2013.01)

(58) Field of Classification Search
None
See application file for complete search history.

(56) References Cited

U.S. PATENT DOCUMENTS

| | | | | |
|---|---|---|---|---|
| 2002/0011987 A1* | 1/2002 | Kitazawa | .............. | G06F 3/0386 345/156 |
| 2006/0176377 A1* | 8/2006 | Miyasaka | ............ | H04N 9/3179 348/222.1 |
| 2009/0021480 A1* | 1/2009 | Tagawa | ................. | G06F 3/0386 345/158 |
| 2011/0025818 A1* | 2/2011 | Gallmeier | ............... | G06F 3/017 348/14.07 |
| 2011/0221919 A1* | 9/2011 | Zhang | ................... | G06F 3/0386 348/222.1 |
| 2014/0247216 A1* | 9/2014 | Fang | ..................... | G06F 3/0325 345/158 |
| 2015/0130717 A1* | 5/2015 | Hasu | ..................... | G06F 3/0418 345/158 |
| 2016/0154472 A1* | 6/2016 | Furukawa | ............. | G06F 3/0304 345/157 |

\* cited by examiner

*Primary Examiner* — Kent W Chang
*Assistant Examiner* — Benjamin Morales (57) ABSTRACT

The present invention mainly discloses a laser spot detecting and locating system for use in a computer projection system, mainly comprising: a video recorder and a detecting module. The video recorder is used to capture a projected image provided on a projection screen by a projector and a laser spot provided on the projection screen by a laser pointer. Thus, during commercial presentation or classroom teaching, presentation processes and contents of a presenter and moving traces of the laser spot would be simultaneously recorded by the video recorder. Furthermore, by immediately converting the coordinate of the laser spot to a screen coordinate in a displayed image of a host computer, a mouse cursor can be simultaneously moved to the corresponding screen coordinate with the motion of the laser spot.

6 Claims, 5 Drawing Sheets

LASER SPOT DETECTING AND LOCATING SYSTEM AND METHOD THEREOF

BACKGROUND OF THE INVENTION

1. Field of the Invention

The present invention relates to the technology field of presentation systems for use in commercial presentation or classroom teaching, and more particularly to a laser spot detecting and locating system and a method thereof.

2. Description of the Prior Art

During commercial presentation or classroom teaching, presenter commonly shows information or contents he want to share to the audiences on a projection screen through a computer and a projector. It is well know that, the presenter often uses a laser pointer to emit one laser spot onto the projection screen, thereby particularly pointing out the information or content currently he mentioned, such that the audiences are able to catch up the speeching content anytime.

With the well development of video technologies and the bloom of internet learning systems, presentation processes and contents of the presenter are often recorded for being as video learning materials. Conventional ways for recording presenter's presentation processes and contents can be divided into external recording and computer software recording, wherein the external recording way is carried out by using an external video recorder to record the presentation processes and contents of the presenter real time. However, such recording way is always subject to various interferences, such as out of focus, overexposure of image frames, and getting a variety of noises. As a result, the recorded contents are rough and then fail to be made as the video learning materials.

On the other hand, computer software recording way is adopted for recording the presentation processes and contents of the presenter through using an image frames recording software to record presenter's presentation processes and contents as well as collecting and recording the presenter's voice by a microphone. Therefore, image files comprising the presentation processes and contents and audio files comprising the presenter's voice are integrated and subsequently outputted as at least one presentation video file for being as video learning materials. It is worth noting that, moving traces of a laser spot provided on the projection screen by the laser pointer would not be simultaneously recorded in the image files. As a result, the audiences may not fully catch up the speeching or presentation contents anytime when receiving the information or contents provided by the presenter through the video learning materials.

Thus, in view of the fact that conventional ways for recording presenter's presentation processes and contents still exhibit many shortcomings and drawbacks, the inventors of the present application have made great efforts to make inventive research thereon and eventually provided a laser spot detecting and locating system and a method thereof.

SUMMARY OF THE INVENTION

The primary objective of the present invention is to provide a laser spot detecting and locating system and a laser spot detecting and locating method for use in a computer projection system at least comprising a host computer, a projection screen, a laser pointer, and a projector. The laser spot detecting and locating system comprises a video recorder connected to the host computer and a detecting module installed in the host computer. In the present invention, the video recorder is used to capture a projected image provided on a projection screen by the projector, and simultaneously capture a laser spot provided on the projection screen by the laser pointer. Thus, during commercial presentation or classroom teaching, presentation processes and contents of a presenter and moving traces of the laser spot can be simultaneously recorded by the video recorder. Moreover, by real time converting the coordinate of the laser spot to a screen coordinate in a displayed image of a host computer, a mouse cursor is simultaneously moved to the corresponding screen coordinate with the motion of the laser spot. Besides, the present invention further utilizes an exposure modulating unit to automatically adjust an amount of exposure of the video recorder based on the intensity of the laser spot, such that only the image of a laser spot with high intensity would be formed on images sensors of the video recorder, and the projected image provided on the projection screen would not be sensed and then formed on image sensors of the video recorder.

In order to achieve the primary objective of the present invention, the inventor of the present invention provides an embodiment for the laser spot detecting and locating system, comprising:

a video recorder, electrically connected to the host computer and used for capturing a projected image provided on the projection screen by the projector; and a detecting module, installed in the host computer and configured to sense a laser spot shown on the projection screen by the laser pointer;

wherein the detecting module has an exposure modulating unit, and the exposure modulating unit being configured to adjust an amount of exposure of the video recorder based on the intensity of the laser spot, such that only the image of a laser spot with high intensity would be formed on image sensors of the video recorder, and the projected image provided on the projection screen would not be sensed and then formed on image sensors of the video recorder;

wherein a laser spot coordinate is detected by the detecting module, so as to facilitate the host computer capable of controlling a mouse cursor to move and reach a screen coordinate in a displayed image of the host computer.

In the embodiment of the laser spot detecting and locating system, wherein detecting module further comprises:

a light spot detecting unit for detecting the laser spot coordinate;

a coordinate conversion unit, connected to the light spot detecting unit for converting the laser spot coordinate to a screen coordinate in a displayed image of the host computer; and a mouse cursor controlling unit, connected to the coordinate conversion unit and used for controlling the mouse cursor to move and reach the screen coordinate.

Moreover, for achieving the primary objective of the present invention, the inventor of the present invention provides an embodiment for the laser spot detecting and locating method, comprising following steps:

(1) providing a system comprising a video recorder connected to the host computer and a detecting module installed in the host computer; wherein the detecting module has an exposure modulating unit;

(2) using the video recorder to capture a projected image provided on the projection screen by the projector, and simultaneously capture a laser spot provided on the projection screen by the laser pointer;
(3) determining whether an amount of exposure of the video recorder must be adjusted or not; if yes, proceeding to step (4); otherwise, proceeding to step (5);
(4) modulating the amount of exposure of the video recorder by the detecting module based on the intensity of the laser spot, such that only the image of a laser spot with high intensity can be formed on image sensors of the video recorder, and the projected image provided on the projection screen would not be sensed and then formed on image sensors of the video recorder; and
(5) using the detecting module to convert a laser spot coordinate to a screen coordinate in a displayed image of the host computer, and simultaneously control a mouse cursor to move and reach the screen coordinate.

In the embodiment of the laser spot detecting and locating method, wherein the step (4) comprises a plurality of detail steps of:
(41) detecting the laser spot coordinate by a light spot detecting unit of the detecting module;
(42) converting the laser spot coordinate to the screen coordinate by a coordinate conversion unit of the detecting module; and
(43) controlling the mouse cursor to move and reach the screen coordinate by a mouse cursor controlling unit of the detecting module.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a laser spot detecting and locating system and a method thereof disclosed by the present invention, embodiments of the present invention will be described in detail with reference to the attached drawings hereinafter.

Figure 1:
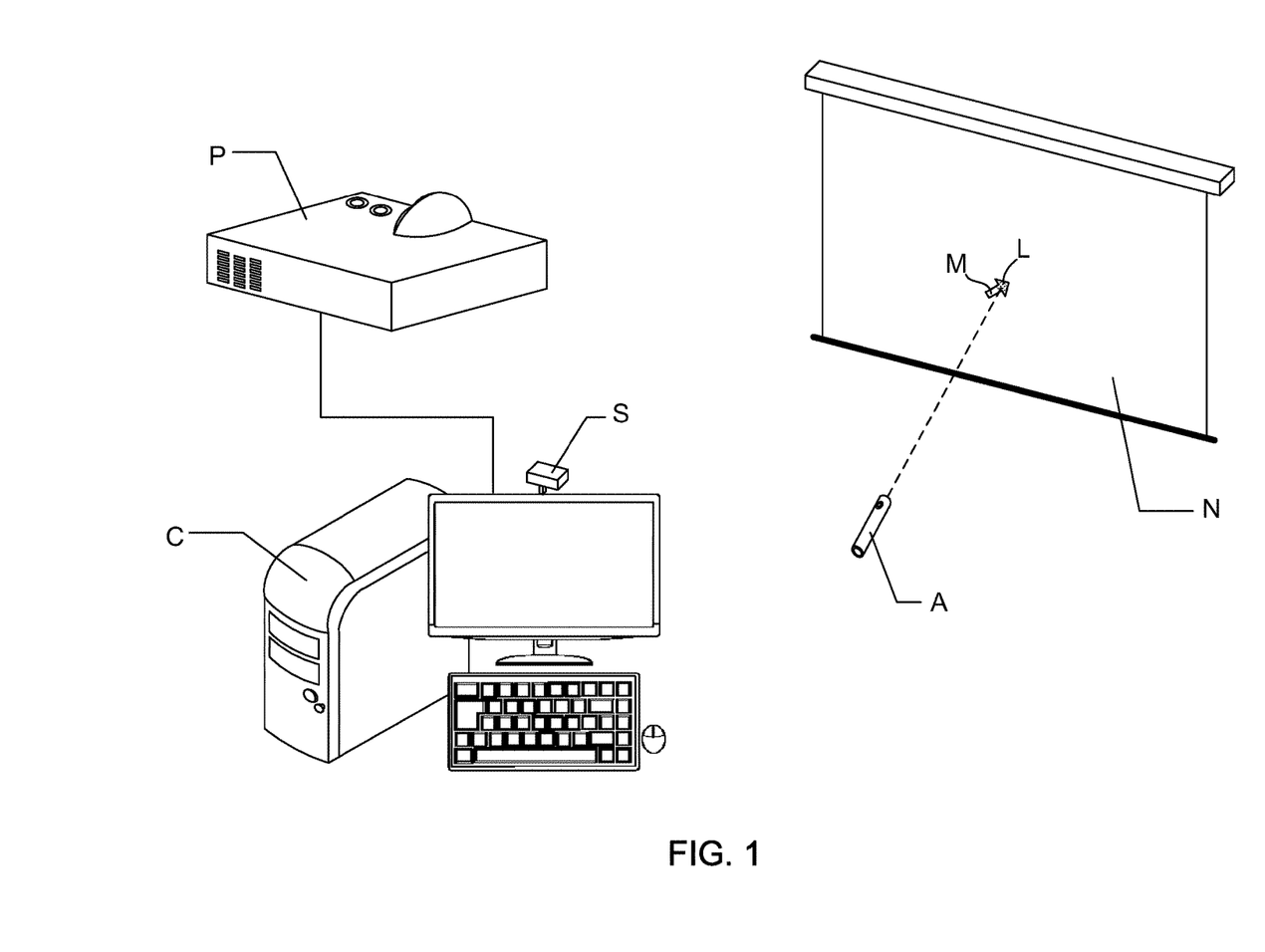
FIG. 1 shows a framework diagram of a laser spot detecting and locating system according to the present invention.
Figure 2:
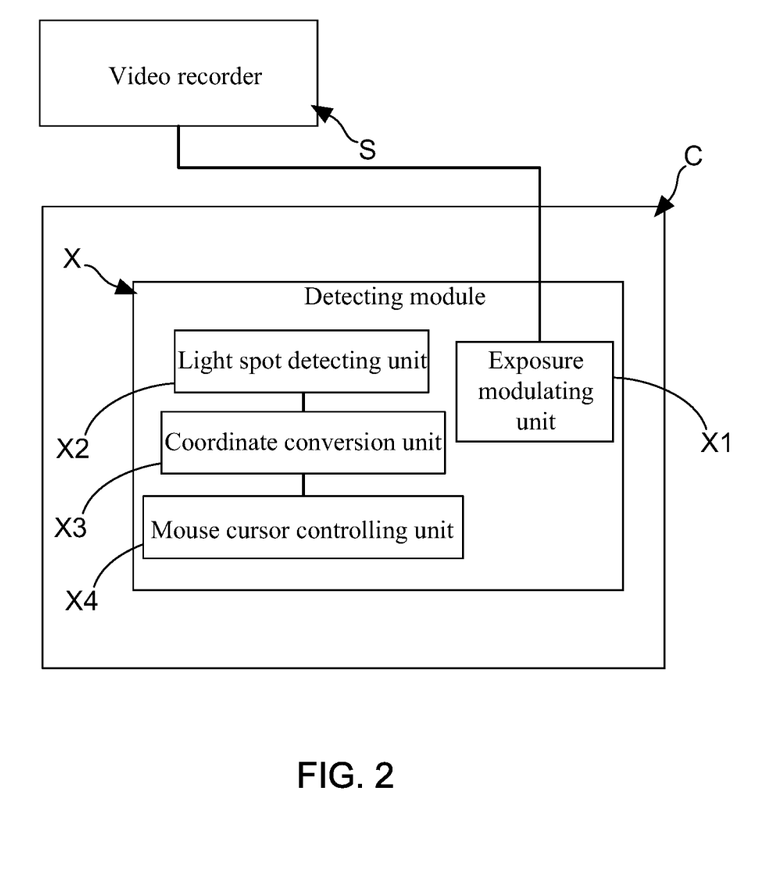
FIG. 2 shows a function block diagram of the laser spot detecting and locating system.

Please refer to FIG. 1, which illustrates framework diagram of a laser spot detecting and locating system according to the present invention. Moreover, please simultaneously refer to FIG. 2, where a function block diagram of the laser spot detecting and locating system is provided. As FIG. 1 and FIG. 2 show, the laser spot detecting and locating system of the present invention is implemented in a computer projection system at least comprising a host computer C, a projection screen N, a laser pointer A, and a projector P, and mainly comprises: a video recorder S connected to the host computer C and a detecting module X installed in the host computer C. According to the particular design of the present invention, the host computer C utilizes the video recorder S to capture a projected image provided on the projection screen N by the projector P and simultaneously capture a laser spot L provided on the projection screen N by the laser pointer A.

On the other hand, the detecting module X comprises an exposure modulating unit X1, a light spot detecting unit X2, a coordinate conversion unit X3, and a mouse cursor controlling unit X4, wherein the light spot detecting unit X2 is configured for determining whether the laser spot L is emitted onto the projection screen N or not, and then detecting a laser spot coordinate. Therefore, the exposure modulating unit X1 is able to adjust an amount of exposure of the video recorder S based on the intensity of the laser spot, such that only the laser spot with high intensity would be image formed on image sensors of the video recorder S, and the projected image provided on the projection screen N would not be sensed and then formed on image sensors of the video recorder S. As a result, the laser spot coordinate can be precisely detected by the detecting module X, so as to facilitate the host computer C control a mouse cursor M to move and reach the laser spot coordinate. In addition, the coordinate conversion unit X3 is connected to the light spot detecting unit X2 for converting the laser spot coordinate to a screen coordinate in a displayed image of the host computer C. Moreover, the mouse cursor controlling unit X4 is connected to the coordinate conversion unit X3 and used for controlling the mouse cursor M to move and reach the screen coordinate.

Thus, during commercial presentation or classroom teaching, presentation processes and contents of a presenter and moving traces of the laser spot L can be simultaneously recorded by the video recorder S. Subsequently, by real time converting the coordinate of the laser spot L to the screen coordinate, the mouse cursor M of the host computer C is simultaneously moved to the corresponding screen coordinate with the motion of the laser spot L. As a result, the audiences can fully catch up the speeching or presentation contents anytime when receiving the information or contents provided by the presenter.

In the present invention, the image sensor of the video recorder S could be a CCD image sensor or a CMOS sensor. Moreover, it is worth explaining that, the exposure modulating unit X1 adjusts the amount of exposure by controlling the size of at least one lens aperture of the video recorder S or through modulating an exposure value (EV) of the video recorder S.

Figure 3:
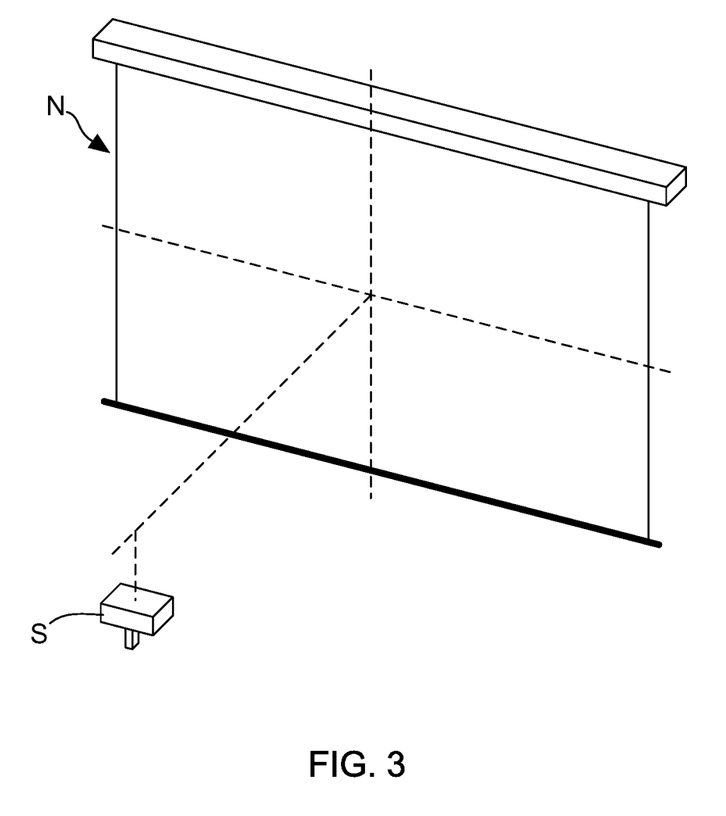
FIG. 3 shows stereo views of a video recorder and a projection screen.
Figure 4:
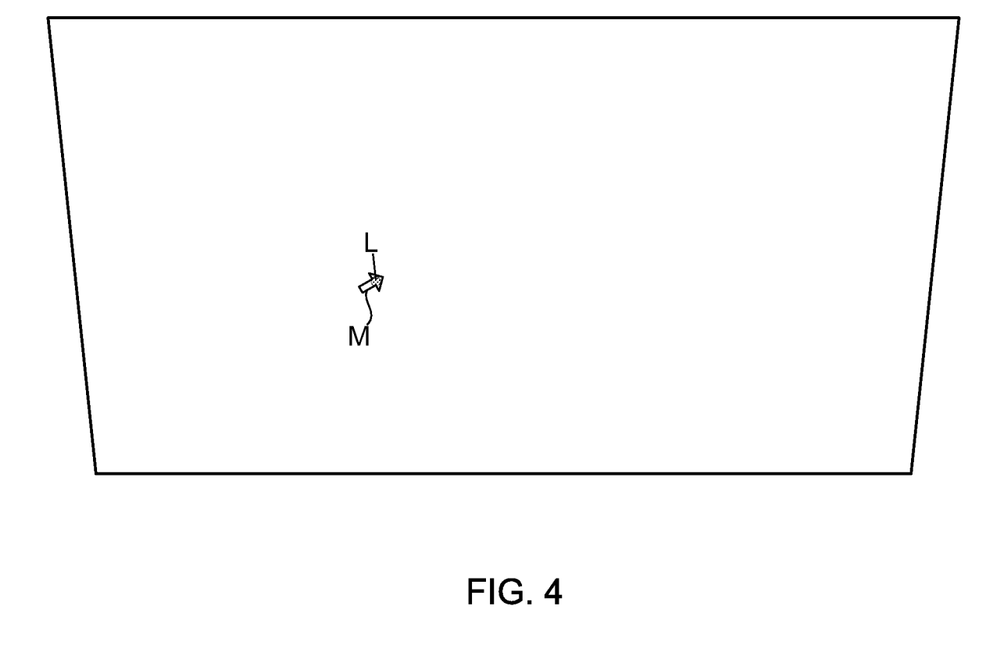
FIG. 4 shows a projected image captured by the video recorder.

Continuously referring to FIG. 1, and please simultaneously refer to stereo views of the video recorder and the projection screen provided in FIG. 3. In the present invention, the video recorder S is disposed at front of the projection screen N, and must locates below a horizontal line elongating from a center coordinate of the projection screen N. Please simultaneously refer to FIG. 4, which illustrates a projected image captured by the video recorder. From FIG. 4, it is understood that the projected image captured by the video recorder S has an inverted trapezoid shape. Particularly, in the present invention, the projected image with the inverted trapezoid shape is converted to a crossed parallelogram image by the coordinate conversion unit X3, therefore the laser spot coordinate can be easily converted to the screen coordinate by a rotation matrix and a scaling matrix of the coordinate conversion unit X3. The rotation matrix is provided as follows.

$$\begin{bmatrix} uq \\ vq \\ q \end{bmatrix} = \begin{bmatrix} e-fh & ch-b & bf-ce \\ fg-d & a-cg & cd-af \\ dh-eg & bg-ah & ae-bd \end{bmatrix} \begin{bmatrix} x \\ y \\ 1 \end{bmatrix} \quad (1)$$

Corresponding coordinates for four top points of the projected image with inverted trapezoid shape can be set as (x0, y0), (x1, y1), (x2, y2), and (x3, y3), respectively. Moreover, variables "u" and "v" in the mathematic equation (1) mean an X coordinate and a Y coordinate of any one point in the projected image been treated with the rotation matrix conversion. On the other hand, "q" in the mathematic equation (1) represents a constant, and others variables are introduced and described in following Table (1).

TABLE (1)

| Variables | Description |
|---|---|
| a | a = x1 − x0 + gx1 |
| b | a = x3 − x0 + hx3 |
| c | c = x0 |
| d | d = y1 − t0 + gy1 |
| e | e = y3 − y0 + hy3 |
| f | f = x0 |
| g | $g = \dfrac{\begin{bmatrix} \Sigma x & \Delta x2 \\ \Sigma y & \Delta y2 \end{bmatrix}}{\begin{bmatrix} \Sigma x1 & \Delta x2 \\ \Sigma y1 & \Delta y2 \end{bmatrix}}$ |
| h | $h = \dfrac{\begin{bmatrix} \Delta x1 & \Sigma x \\ \Delta y1 & \Sigma x \end{bmatrix}}{\begin{bmatrix} \Delta x1 & \Delta x2 \\ \Delta y1 & \Delta y2 \end{bmatrix}}$ |
| Δx1 | Δx1 = x1 − x2 |
| Δx2 | Δx2 = x3 − x2 |
| Δy1 | Δy1 = y1 − y2 |
| Δy2 | Δy2 = y3 − y2 |
| Σx | Σx = x0 − x1 + x2 − x3 |
| Σy | Σy = y0 − y1 + y2 − y3 |

In addition, the scaling matrix is provided as following mathematic equation (2). It must explains that, variables "X" and "Y" in the mathematic equation (2) mean an X coordinate and a Y coordinate of any one point in the projected image been treated with the scaling matrix conversion. On the other hand, "W" in the mathematic equation (2) represents a constant, and "P" and "Q" are the length and the width of resolution of the projected image been treated with the scaling matrix conversion.

Table (1)

$$\begin{bmatrix} XW \\ YW \\ W \end{bmatrix} = \begin{bmatrix} P & 0 & 0 \\ -P & -Q & -2 \\ 0 & 0 & 1 \end{bmatrix} \begin{bmatrix} u \\ v \\ 1 \end{bmatrix} \quad (2)$$

Therefore, through above descriptions, the laser spot detecting and locating system of the present invention have been introduced completely and clearly. Next, a laser spot detecting and locating method of the present invention will be introduced in following paragraphs.

Figure 5:
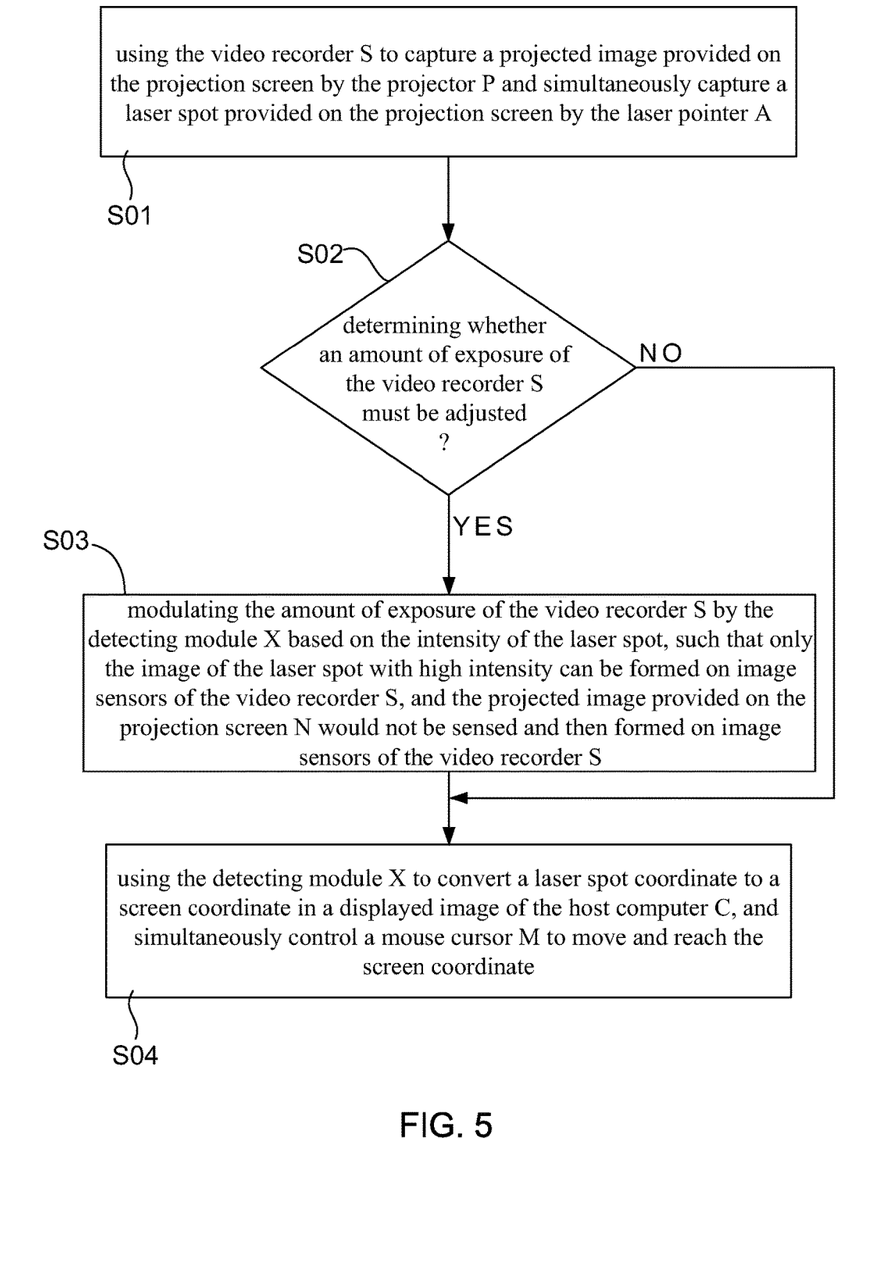
FIG. 5 shows a flowchart diagram of a laser spot detecting and locating method according to the present invention.

Continuously referring from FIG. 1 to FIG. 4, and please simultaneously refer to FIG. 5, where a flowchart diagram of the laser spot detecting and locating method according to the present invention is provided. As FIG. 5 shows, the laser spot detecting and locating method mainly comprises following four steps:

S01: using the video recorder S to capture a projected image provided on the projection screen by the projector P and simultaneously capture a laser spot provided on the projection screen by the laser pointer A;

S02: determining whether an amount of exposure of the video recorder S must be adjusted or not; if yes, proceeding to step (4); otherwise, proceeding to step (5);

S03: modulating the amount of exposure of the video recorder S by the detecting module X based on the intensity of the laser spot, such that only the image of the laser spot with high intensity can be formed on image sensors of the video recorder S, and the projected image provided on the projection screen N would not be sensed and then formed on image sensors of the video recorder S; and S04: using the detecting module X to convert a laser spot coordinate to a screen coordinate in a displayed image of the host computer C, and simultaneously control a mouse cursor M to move and reach the screen coordinate.

In the step (S02), the way to determining whether an amount of exposure of the video recorder S must be adjusted or not is carried out by calculating the brightness difference between the laser spot L and the projected image provided on the projection screen by the projector P. When, executing exposure modulation, the exposure modulating unit X1 is configured to adjust the amount of exposure of the video recorder S, so as to make the exposure amount reach the lowest level. As a result, only the laser spot with high intensity would be image formed on image sensors of the video recorder S, and the projected image provided on the projection screen N would not be sensed and then formed on image sensors of the video recorder S. Therefore, the coordinate of the laser spot is precisely detected by the light spot detecting unit X2; moreover, after the laser spot coordinate is converted to a screen coordinate in a displayed image of the host computer C by the coordinate conversion unit X3, and the mouse cursor controlling unit X4 is able to control a mouse cursor M to move and reach the screen coordinate.

For realizing above-motioned technology features, the step (S04) is further designed to comprises following three detail steps:

S041: detecting the laser spot coordinate by a light spot detecting unit X2 of the detecting module X;

S042: converting the laser spot coordinate to the screen coordinate by a coordinate conversion unit X3 of the detecting module X; and S043: controlling the mouse cursor M to move and reach the screen coordinate by a mouse cursor controlling unit X4 of the detecting module X.

Thus, above descriptions have introduced the laser spot detecting and locating system and method provided by the present invention completely and clearly. Next, a variety of experimental data will be provided in following paragraphs for proving the practicability of the system and the method.

It is worth explaining that, there have two experiments been completed for obtaining the experimental data, wherein first of the two experiments includes an experimental group and a control group. Moreover, testing objects in the experimental group and the control group are respectively the laser spot detecting and locating system of the present invention and a modular stylus device disclosed by U.S. Patent Publication No. US2014/0028635 A1.

During the experiment, a mouse cursor and a laser spot are firstly set to have the same initial screen coordinate in a computer screen; and subsequently, the laser spot is moved from the initial screen coordinate to a center coordinate of the computer screen. It is noting that, the laser spot detecting and locating system is used for sensing the moving traces of the laser spot so as to simultaneously control the mouse cursor to move with the motion of the laser spot. Moreover, final coordinates of the laser spot and the mouse cursor are both recorded. Having the same experimental operation as the laser spot detecting and locating system, the modular stylus device disclosed by U.S. Patent Publication No. US2014/0028635 A1 is configured to emit a laser spot onto the computer screen and subsequently make the laser spot move from its initial coordinate to the center coordinate of the computer screen. Moreover, final coordinates of the laser spot and the mouse cursor are both recorded. Related experimental data are integrated and listed in following Table (2).

TABLE 2

| Testing item | Control group | Experiment group | Reduced pixel distance error |
| --- | --- | --- | --- |
| Error of pixel distance | 207 (pixel dots) | 3.5 (pixel dots) | 203.5 (pixel dots) |
| Error rate (Total number of pixels is 683) | 30.3% | 0.05% | 30.25% |

Experimental data of Table (2) reveals that, there is merely a minor difference of 3.5 pixel dots between the coordinate of laser spot and the coordinate of mouse cursor after the mouse cursor is controlled by laser spot detecting and locating system to move with the motion of the laser spot. However, compared to the laser spot detecting and locating system of the present invention, there is a large difference of 207 pixel dots between the coordinate of laser spot and the coordinate of mouse cursor after the mouse cursor is controlled by modular stylus device to move with the motion of the laser spot. As a result, related experimental data have proved that the laser spot detecting and locating system proposed by the present invention can indeed precisely detect the laser spot irradiated on the projection screen by a laser pointer, and is able to control the mouse cursor move with the motion of the laser spot immediately. On the other hand, the second experiment also includes an experimental group and a control group. Moreover, testing objects in the experimental group and the control group are respectively a video recorder S with an exposure modulating unit X1 and a video recorder S. During the second experiment, a laser pointer A is adopted for emitting a laser spot L onto a projection screen N, and then the two video recorders S are used to sense and capture the laser spot L. Following Table (3) shows the data of success rate of the laser spot given exposure by the two video recorders S.

TABLE 3

| | Control group | Experiment group | Increased success rate |
| --- | --- | --- | --- |
| Success rate of the laser spot given exposure by the video recorder | 20% | 100% | 80% |

It is well known that, high-intensity laser spot is easy to be exposed as a white spot on image sensors of the video recorder S, such that the video recorder S cannot precisely sense and locate the coordinate of the high-intensity laser spot while the laser spot is emitted onto a projected image showing whole-white contents provided on the projection screen by a projector P. Experimental data of Table (3) reveals that, there is merely twenty-percent success rate that the high-intensity laser spot is exposed on the image sensors of the video recorder S (i.e., the control group). However, compared to the control group, the high-intensity laser spot can be exposed on the image sensors of the video recorder S having the exposure modulating unit X1 by 100% of exposure success rate.

Therefore, through above descriptions, the laser spot detecting and locating system and method proposed by the present invention have been introduced completely and clearly; in summary, the present invention includes the advantages of:

(1) By implemented this laser spot detecting and locating system or method in a computer projection system, presentation processes and contents of a presenter and moving traces of a laser spot can be simultaneously recorded by the video recorder for being further made as a video learning material during the presenter's commercial presentation or classroom teaching. As a result, audiences can fully catch up the speeching or presentation contents anytime when receiving the information or contents provided by the presenter through the video learning material.

(2) Moreover, owing to the fact that a high-intensity laser spot is easy to be exposed as a white spot on image sensors of the video recorder, the present invention further utilizes an exposure modulating unit to automatically adjust an amount of exposure of the video recorder based on the intensity of the laser spot, such that only the image of a laser spot with high intensity would be formed on images sensors of the video recorder, and the projected image provided on the projection screen would not be sensed and then formed on image sensors of the video recorder. Experimental data have proved that, high-intensity laser spot can be precisely sensed and located by the video recorder S having the exposure modulating unit X1 by 100% of exposure success rate.

The above description is made on embodiments of the present invention. However, the embodiments are not intended to limit scope of the present invention, and all equivalent implementations or alterations within the spirit of the present invention still fall within the scope of the present invention.

What is claimed is:

1. A laser spot detecting and locating system, being implemented in a computer projection system at least comprising a host computer, a projection screen, a video recorder, being electrically connected to the host computer, and used for capturing a projected image provided on the projection screen by the projector; and a detecting module, being installed in the host computer and being configured to sense a laser spot on the projection screen through the video recorder; wherein the laser spot emitted from the laser pointer, and the detecting module having an exposure modulating unit and a coordinate conversion unit;

wherein the exposure modulating unit is configured to adjust an amount of exposure of the video recorder based on the intensity of the laser spot, such that only the laser spot with high intensity would be image formed on image sensors of the video recorder in the case of the projected image provided on the projection screen not being sensed and then formed on image sensors of the video recorder;

wherein a laser spot coordinate is detected by the detecting module, so as to facilitate the host computer capable of controlling a mouse cursor to correspondingly move and reach a screen coordinate in a displayed image of the host computer;

wherein the projected image captured by the video recorder has an inverted trapezoid shape, and the projected image with the inverted trapezoid shape being converted to a crossed parallelogram image by the coordinate conversion unit, therefore the laser spot coordinate is easily converted to the screen coordinate by a rotation matrix and a scaling matrix of the coordinate conversion unit.

2. The laser spot detecting and locating system of claim 1, wherein the detecting module further comprises:

a light spot detecting unit, being connected to the coordinate conversion unit and used for detecting the laser spot coordinate; and a mouse cursor controlling unit, being connected to the coordinate conversion unit, and used for controlling the mouse cursor to move and reach the screen coordinate.

3. The laser spot detecting and locating system of claim 1, wherein the image sensor of the video recorder S is a CCD image sensor or a CMOS sensor.

4. The laser spot detecting and locating system of claim 1, wherein the exposure modulating unit adjusts the amount of exposure by controlling the size of at least one lens aperture of the video recorder.

5. The laser spot detecting and locating system of claim 1, wherein the exposure modulating unit adjusts the amount of exposure by modulating an exposure value (EV) of the video recorder.

6. The laser spot detecting and locating system of claim 2, wherein the video recorder is disposed at front of the projection screen, and locating below a horizontal line elongating from a center coordinate of the projection screen.

* * * * *